Patented June 9, 1936

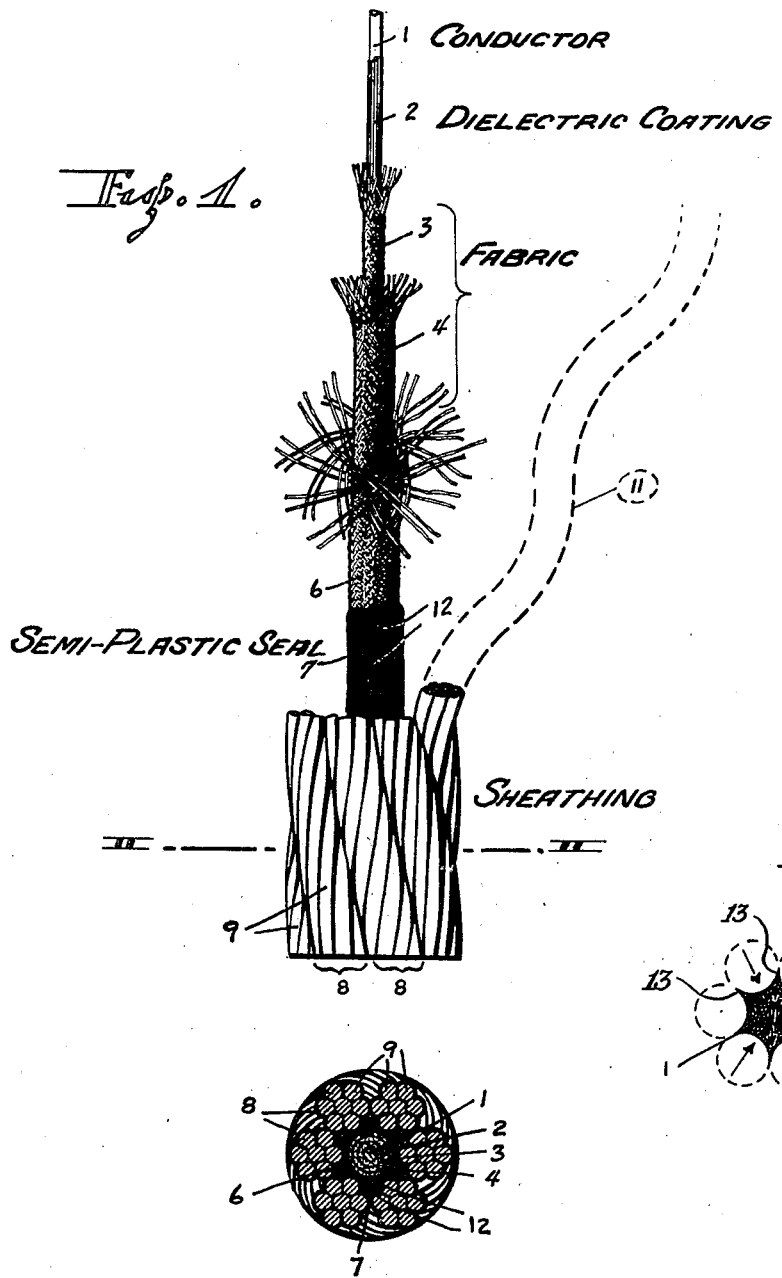

2,043,400

UNITED STATES PATENT OFFICE 2,043,400

CONDUCTOR CABLE

Walter T. Wells, Los Angeles, Calif., assignor to The Technicraft Engineering Corporation, Los Angeles, Calif., a corporation of California Application March 27, 1933, Serial No. 662,901

12 Claims. (Cl. 173—266)

The present invention is a conductor cable.

The structure hereinafter described is a special-purpose cable and is designed for use in connection with electrically operated devices which must operate while submerged to great depths and under conditions of extreme hydrostatic pressure.

In the firing of explosive charges, in deep wells, it is desirable to ignite said charges by electrical energy, transmitted from a source at the mouth of the well, through a cable which must be several thousand feet in length.

Cable for this type of service must be built to withstand pressures and strains to which conventional haulage or hoisting wire rope structures are subjected.

As an example, an oil well casing is to be perforated by gun-fire and a type of gun is employed in which thermal elements are imbedded in explosive charges within the gun, and such charges are to be fired at intervals of time and distance throughout a given zone in the length of the casing.

Cable employed in this instance must have sufficient tensile strength to permit the suspension of great lengths of cable and in addition to its own weight it must also support a tool attached to the lower end of the cable, and must have, as an additional factor of safety, sufficient excess strength to retrieve the tool should it become lodged in sand or otherwise impeded in its operation.

As the cable must be a conductor of electrical energy, an inner conductor member must be so insulated that water will not contact the wire, or wires, to be energized, and the insulation employed must be so compacted, when formed, as to be entirely free from voids and to withstand extreme hydrostatic pressure.

Such insulation must, if the cable is to be serviceable for the uses mentioned, have a degree of flexibility as well as inherent qualities of adhesiveness to compensate for stretch-and-return movement within, and throughout the length of, the cable.

I have found rubber to be impractical for use in such insulation as it contains microscopic voids which open under external hydrostatic pressure, and the sulphur content of rubber deteriorates and renders the insulation ineffective.

Spirally wrapped fabric, whether impregnated or not, will not withstand such pressure and becomes saturated so that a short is unavoidable.

I have discovered that an asphaltic compound possesses the requisite characteristics for remedying the defects of conventional insulative materials but the specific nature of the compound is not important as long as it possesses the requisite characteristics.

In the accompanying drawing, Figure 1 is side elevation of my improved cable, showing the laminae as broken away, successively to illustrate the composite structure.

Figure 2 is a transverse section of Figure 1, taken on the line II—II of said figure, and Figure 3 is a diagrammatic figure illustrating lines of force applied to a core by an outer stranded lay.

Referring to the drawing, the numeral 1 indicates a conductor wire, preferably of copper. Said conductor 1 is provided with a suitable flexible dielectric coating and in the form shown is enamelled, as indicated at 2, with as heavy an insulative coat as it is possible to give it.

The enamel used is of very high dielectric strength and will not chip or crack from the conductor when subjected to severe bending tests and is, therefore, flexible enough to expand and contract with the conductor.

The enamelled wire is then covered with a tubular covering 3 of closely woven fabric, preferably cotton, said tubing being what is technically known as a ten-two braid.

A second or intermediate covering 4 of the same material and structure is snugly overlaid on the inner tubing 3, and an outer covering 6 is closely woven to overlie and enclose the inner and intermediate coverings and is formed in the same manner.

This triple-covered wire is next drawn through a container (not shown) in which is a quantity of insulative compound and said compound is maintained under a degree of pressure sufficient to cause it to penetrate the fabric layers and is heated to a degree whereby, when extruded from the container, it will have entirely impregnated the voids and interstices of the three-ply covering 3, 4, and 6, and will build up to substantially cylindrical form, a layer greater in diameter than the largest of said coverings as shown at 7. At high temperature this material is sticky and after penetrating the coverings 3, 4 and 6, adheres tightly to the enamel 2 or other suitable dielectric coating used.

The consistency and melting point of the compound are so predetermined as to produce at normal temperatures a dense, flexible, and a semi-plastic or malleable core impervious to water and practically insoluble in water, oil, gasoline or the various ingredients of crude oil.

An outer lay of stranded steel is wound around said core and comprises six strands 8, containing seven wires each, said wires being designated at 9 in the drawing.

The wires 9 are twisted, the strands 8 are twisted in reverse direction, and each of said strands is "pre-formed", that is to say, is helically formed before being twisted together, to insure a close wrap around core 7, and also to eliminate what is known as initial stretch and the tendency to twist in the newly finished cable. This helical pre-forming operation is illustrated in dotted lines at 11 in Figure 1.

When the outer lay of strands 8 is applied to the core 7, by machines well known in cable manufacture, the constrictional force of the strands 8 imbeds the wires 9 in the malleable core 7, as illustrated at 12, Figures 1 and 2, greatly retarding any slippage between the core and the outer lay and, in addition, the insulative material adheres to the wires forming the strands 8.

It will be seen that the core of my cable is solid, that it precludes the possibility of intrusion of water or oil to the conductor 1, and that a body of asphaltic material is interposed between, and caused to adhere to, the outer lay and the woven fabric which will insure simultaneous longitudinal movement of the members without applying undue stress to the woven coverings or to the conductor 1, said members elongating and contracting as a unit.

My cable has one advantage not found in other structures, commonly employed for the purposes cited, to-wit:

The convolute indentations 12 in the malleable core 7 engage both the strands 8 and the oppositely twisted wires 9 in a manner affording a maximum frictional resistance to slippage between the outer lay and the core and in addition to this the structure is automatically effective to re-seal the fluid-tight bond at each run of the cable to great depths in deep wells.

The heat commonly encountered at such depths is sufficient to soften the core 7 and increase its plasticity so that the constrictional force of the strands of the outer lay forces the pliant insulative material into ridges 13, Figure 3, which entirely fill the spaces between contiguous members of said outer lay. The lines of force in this operation are illustrated by arrows in Figure 3.

It should be noted that the strands 8 are few in number and therefore necessarily occupy the major part of the diameter of the cable. This insures, what is known in the rope-making art, as a pronounced "key-stoning effect"; that is, the strands tend to wedge against each other when the rope is flexed and maintain their position around the core. When the strands exceed eight in number the key-stoning effect becomes less pronounced and as a result the core tends to push through or separate the strands when the rope is flexed. This is particularly true when the rope is wound on drums and passed repeatedly over sheaves. It is absolutely mandatory for successful operation of my special conductor core wire rope that it be capable of measuring up in all respects to standard wire rope of the haulage or hoisting type of the same diameter and grade of steel. In fact, this is completely accomplished with the construction herein described, for neither my special core nor a conventional hemp core adds to the strength of the wire rope. My special core is no larger than the conventional hemp core used in the standard hoisting, haulage or transmission ropes and because of the fabric servings and semi-plastic material is capable of conforming to the presented surfaces of the rope strands in practically the same manner as the hemp core. In other words my conductor core wire rope can be used to accomplish any function of a conventional wire rope of the same size with the additional feature of passing current between extremities of the rope so that an electrical tool may be both suspended and operated from the end of the cable.

I claim:

1. A conductor cable, substantially as described, comprising a conductor of electrical energy, provided with a flexible dielectric coating, laminations of woven fabric surrounding said conductor, a layer of malleable, moisture-proof material surrounding said fabric and completely filling the voids therein, and an outer lay composed of a plurality of stranded wires.

2. A conductor cable, substantially as described, comprising a conductor of electrical energy, provided with a flexible dielectric coating, laminations of woven fabric surrounding said conductor, a layer of malleable, moisture-proof material surrounding said fabric and completely filling the voids therein, and an outer lay composed of a plurality of stranded wires, said strands and said wires being so pre-formed as to insure a tight wrap in the finished cable.

3. A cable of the character described, comprising an outer lay of stranded wires, forming the weight-supporting part of said cable, a dielectric-coated conductor within said lay, a woven covering for said conductor, and a tubular layer of malleable, moisture-proof material interposed between said lay and said conductor, impregnating the weave of said covering, and adhering to the members composing said stranded lay.

4. A weight-supporting cable for carrying electricity, comprising a conductor of electrical energy, provided with a flexible dielectric coating, a lamination of woven fabric surrounding said dielectric coating and enclosing said conductor, a layer of malleable, moisture-proof material surrounding said fabric and completely filling the voids therein, and an outer lay composed of a plurality of stranded wires, said stranded wires being preformed before laying up in the finished cable.

5. A conductor core wire rope comprising: a relatively small core including, a conductor, a woven fabric thereabout, a fluid resistant semi-plastic material thoroughly impregnating the fabric with the excess forming an external sealing layer; and a plurality of multiple wire strands laid about the core, said strands occupying the major diameter of the wire rope.

6. A hoisting and conductor cable comprising a conductor core, a dielectric coating therefor, a weight supporting spirally stranded wire outer sheath occupying at least one-half the diameter of the cable, and a layer of semi-plastic fluid resistant material surrounding the core and adhering to the sheath and adapted to resist extreme hydrostatic pressures.

7. A hoisting and conductor cable comprising a conductor core, a dielectric coating therefor, a layer of semi-plastic fluid resistant material surrounding the core and adapted to resist extreme hydrostatic pressures, and a weight supporting spirally stranded wire outer sheath occupying at least one-half the diameter of the cable surrounding said layer and adhesively associated therewith, the strands of said sheath being preformed.

8. A hoisting and conductor cable comprising a conductor core, a dielectric coating therefor, a woven fabric surrounding the core, semi-plastic fluid resistant material thoroughly impregnating the fabric and forming an external layer and adapted to resist extreme hydrostatic pressures, and a weight supporting spirally stranded wire outer sheath occupying at least one-half the diameter of the cable surrounding said layer and adhesively associated therewith.

9. A hoisting and conductor cable comprising a conductor core, a dielectric coating therefor, a woven fabric surrounding the core, semi-plastic fluid resistant material thoroughly impregnating the fabric and forming an external layer and adapted to resist extreme hydrostatic pressures, and a weight supporting spirally stranded wire outer sheath occupying at least one-half the diameter of the cable surrounding said layer and adhesively associated therewith, the strands of said sheath being pre-formed.

10. A hoisting and conductor cable comprising a conductor core, a weight supporting spirally stranded wire outer sheath occupying at least one-half the diameter of the cable, and a layer of semi-plastic fluid resistant and insulating material surrounding the core and adhering to the sheath and adapted to resist extreme hydrostatic pressures.

11. A hoisting and conductor cable comprising a conductor core, a layer of semi-plastic fluid resistant and insulating material surrounding the core and adapted to resist extreme hydrostatic pressures, and a weight supporting spirally stranded wire outer sheath occupying at least one-half the diameter of the cable surrounding said layer and adhesively associated therewith, the strands of said sheath being preformed.

12. A conductor core wire rope adapted for use in oil wells including a centrally disposed conductor, a fabric covering therefor, a semi-plastic fluid resistant insulating compound impregnating the covering to an exesss to form an external sealing layer, a multiplicity of spirally wound wire strands enveloping the covering and embedded in the said layer, the size of the strands with respect to the core and their number being such as to exhibit a pronounced key-stoning effect, and said compound tending to increase its plasticity under the heat of operating conditions and reconform to the said strands.

WALTER T. WELLS.